United States Patent [19]
Voss et al.

[11] Patent Number: 5,400,817
[45] Date of Patent: Mar. 28, 1995

[54] HIGH-CAPACITY PRESSURE LIMITING VALVE

[75] Inventors: Richard Voss; Wolfgang Voss, both of Schwerte, Germany

[73] Assignee: Richard Voss Grubenausbau GmbH, Schwerte, Germany

[21] Appl. No.: 159,144

[22] Filed: Nov. 30, 1993

[30] Foreign Application Priority Data

Jan. 27, 1993 [DE] Germany ............ 43 02 080.1

[51] Int. Cl.⁶ .................................. G05D 16/10
[52] U.S. Cl. .................................. 137/491
[58] Field of Search ............ 137/489, 491, 494

[56] References Cited

U.S. PATENT DOCUMENTS

| | | | |
|---|---|---|---|
| 2,333,522 | 11/1943 | Clifton | 137/491 |
| 2,625,174 | 1/1953 | Forde | 137/491 |
| 3,174,410 | 3/1965 | Booth | 137/491 X |
| 3,482,594 | 12/1969 | Simon | 137/538 |
| 3,613,716 | 10/1971 | Hoheisel | 137/491 |
| 4,135,541 | 1/1979 | Lorimor | 137/491 X |
| 4,530,373 | 7/1985 | Bork | 137/538 X |
| 4,597,410 | 7/1986 | Wilke | 137/491 |
| 4,716,928 | 1/1988 | Kussel | 137/538 X |
| 5,168,895 | 12/1992 | Voss | 137/491 |

FOREIGN PATENT DOCUMENTS

| | | |
|---|---|---|
| 1909338 | 7/1978 | Germany . |
| 3314837 | 12/1983 | Germany . |
| 2830891 | 1/1986 | Germany . |
| 3922894 | 2/1991 | Germany . |
| 3929094 | 4/1991 | Germany . |
| 4021622 | 8/1991 | Germany . |

OTHER PUBLICATIONS

Exner et al., Grundlagen und Komponenten der Fluidtechnik Hydraulik (The Foundation and Components of the Fluid Technology Hydraulics), Der Hidraulik Trainer, Band 1, pp. 216-217. (Undated).

*Primary Examiner*—Robert G. Nilson
*Attorney, Agent, or Firm*—James Creighton Wray

[57] ABSTRACT

A pressure limiting valve with rates of flow of more than 8,000 l/min exhibits a valve casing comprising a control piston and valve piston. These valve casings are arranged inside the casing so as to be movable against corresponding springs, whereby the control piston and valve piston are separate units. The valve piston is arranged so as to be movable against an adjustment screw that is supported on the control piston side and has a through-bore that has a smaller diameter than the blind bore of the control piston. This special design of the valve ensures a uniform opening and reclosing of the pressure limiting valve for the described rates of flow, whereby suitable sealing rings consisting of Teflon are used in the area of the valve piston.

12 Claims, 2 Drawing Sheets

HIGH-CAPACITY PRESSURE LIMITING VALVE

BACKGROUND OF THE INVENTION

The invention relates to a pressure limiting valve for protecting hydraulic units, especially protecting the hydraulic face support of underground operations against rock bursts or other overloads, comprising a control piston that is movable inside an internal bore in the valve casing against the force of a valve spring, where said control piston blocks off the adjustment screw bore associated with the spring chamber and cooperates with a valve piston with blind bore and radial bores, which is guided in a movable manner in an expanded large bore that merges into a compensation chamber and is sealed via sealing rings, and which, when subjected to pressure, connects the cross-bores serving as discharge bores with the large bore by driving over the sealing rings.

Such pressure limiting valves, also called rock burst valves, are used where the occurrence of an overload would threaten to damage the hydraulic support in underground hard coal mining. The hydraulic props, both as individual props and in support frames, are equipped with such pressure limiting valves in order to prevent permanent damage or even destruction in the case of an overload, and thus to prevent such threats to the miners. German Patent 28 30 891 reveals a pressure limiting valve in which overpressures in the hydraulic system are reduced via a valve spring located between a plug screw and valve piston. A conical or spherical closure element that is lifted from the valve seat when an overload occurs is shaped to the valve plate or spring plate. A damping cylinder that restricts the passage opening is shaped to the piston. These known pressure limiting valves do not exhibit a sufficient closing safety. In addition, a correct design of the spring in particular is very difficult, but represents the precondition for a safe response for such a rock burst valve.

Further developments of this kind are found in German Patent 33 14 837, German Patent 39 22 984, and also German Patent 39 29 094. The two latter pressure limiting valves exhibit a construction that permits a rate of flow of approximately 1,000 l/min, whereby the valves are markedly small. This is accomplished by constructing the valve piston as a tubular sheath that cooperates with a control piston, so that both can be moved together as a structural unit inside the internal bore of the valve casing. The known control piston exhibits a blind bore and radial bores through which the pressure medium is able to flow into the spring chamber when the valve responds. The necessary differential surfaces are thus realized with the stepped control piston or the different diameters of control piston and valve piston. The disadvantage in this pressure limiting valve and in the one known from German Patent 39 29 094 consists of the still insufficient closing values, whereby in particular a reclosing of the valve and thus a fluttering of the valve piston occurs, since both pistons must be moved simultaneously. The valve spring being used must be accordingly large and long, requiring a more complex construction for such pressure limiting valves.

SUMMARY OF THE INVENTION

This invention is thus based on the task of creating a flawlessly opening and closing pressure limiting valve with a small adjustment spring and high rates of flow.

According to the invention, this task is solved in that the control piston and valve piston are separate units, that the valve piston can be moved against an adjustment spring supported on the control piston side and has a through-bore with a smaller diameter than the blind bore of the control piston, and that at least the sealing rings associated with the valve piston are constructed as plastic rings (Teflon TFM 1600) that are rectangular and very hard, and that were preloaded when they were installed.

A pressure limiting valve constructed in this manner is first opened by the control piston with the somewhat larger blind bore, whereby the pressure fluid passes through the through-bore into the compensation chamber, and from there into the blind bore. If the rate of flow or the present pressure increases, the valve piston with the significantly larger diameter also opens, and the pressure fluid is able to escape through the cross-bores, so that the associated hydraulics aggregate, i.e. prop, will not be influenced or even threatened. Since the valve piston must open against the force of a spring and the opening cross-sections have been chosen accordingly, an accurate opening and closing of the overall system is ensured. A fluttering or even premature closing of the valve piston cannot occur, and it is possible, in particular, to use a relatively small adjustment spring, thus resulting in significant advantages for the overall dimensions and overall design of the pressure limiting valve. A fluttering or unintentional closing of the valve piston is prevented by the fact that the latter does not open against the external pressure of approximately 1 bar, but rather against the pressure of the adjustment spring and of the medium present in the compensation chamber. As already mentioned, this enables a correspondingly small size of the adjustment spring.

According to a useful design of the invention, it is provided that the compensation chamber is constructed in the area of an extension of the large bore between the cross-bores and the upper casing part that holds the control piston. The function of the compensation chamber is thus permanently maintained, even if the valve piston is largely driven upwards so that the pressure fluid can be discharged via the cross-bores. The smaller control piston thus remains in the open position as long as an appropriate pressure is present in the compensation chamber. If this pressure then is greater than the pressure present in the large bore, the system closes or the valve piston closes again automatically.

In another useful design, the valve piston is equipped on both sides with a blind bore, whereby the blind bore associated with the compensation chamber holds the adjustment spring. This design of the valve piston enables a distinct shortening of the overall pressure limiting valve without a negative effect on the function. At the same time, a certain guidance of the adjustment spring is achieved and a sufficient volume for the compensation chamber is ensured.

A safe position of the adjustment spring is achieved according to the invention in that the blind bore with the adjustment spring has a bottom that extends at a right angle to the exterior wall of the valve piston. In this way the adjustment spring rests securely on this bottom, and a timely and especially sufficient support of the valve piston is ensured. It is also conceivable that a type of attachment is arranged on the bottom, so that the adjustment spring is additionally given; but as a rule this is not necessary in the case of the pressure limiting valves discussed here.

According to the invention, an advantageous flow in the large bore is ensured in that the blind bore with the radial bores exhibits a conically constructed bottom in whose tip is arranged the through-bore. The pressure fluid flowing through the through-bore prior to the response of the valve piston is thus passed specifically from the large bore into the compensation chamber, and from there to the internal bore or blind bore of the control piston. This simultaneously promotes a timely response of the control piston.

To position the control piston accurately, the invention provides that the control piston is housed in a screwed part with an internal bore, which can be screwed into the valve casing from the compensation chamber. Since the compensation chamber has a suitable volume, the handling is accordingly easy, and an arrangement, which is always identical, of the control piston inside the overall valve is thus secured. It is also possible to advantageously utilize existing components, in particular the control piston. The attachment is facilitated in that here, in the area of the compensation chamber, the connecting area is provided between the top and bottom part. During installation, the top part can be prepared in advance and the control piston already positioned to such an extent that then both parts simply need be set inside each other and screwed together. During this process, the adjustment spring is automatically tightened, not requiring any additional measures.

The attachment of the screwed part into the top part of the valve casing is facilitated in that the internal bore has a hexagon socket on the side facing the compensation chamber. This hexagon socket makes it possible, by way of standard means, to perform the attachment process faster and to accurately maintain the respectively desired position of the screwed part, a process that is safe-guarded with corresponding projections, etc. The compensation chamber is sealed against the threading via O-rings that have been inserted into a groove of the screwed part, i.e. in the area of the hexagon socket.

While the hexagon socket has a diameter somewhat larger than that of the blind bore of the control piston, the internal bore behind it is somewhat larger. It is provided that the internal bore is constructed so as to hold the control piston behind the hexagon socket and has at the top end a groove for a sealing ring constructed as an O-ring. In this way the control piston can be pushed from one side into the internal bore, and is then held in place at the corresponding projection in the transition area to the hexagon socket. During the installation and attachment of the screwed part, it is then no longer able to leave its position and is thus positioned accurately in the function position. The O-ring ensures a tight seal and thus a safe response of the control piston. This seal is, according to the invention, yet even more improved in that the control piston is equipped with four radial bores whose diameter is greater than the cord thickness of the O-ring. The O-ring is deformed accordingly and thus pressed into its seat, so that an optimum sealing effect is achieved in this manner.

It has already been pointed out before that the ratio of the diameters of the through-bore and blind bore of the control piston is important for the functioning of the pressure limiting valve. An optimum is achieved if the through-bore has a diameter of 2.5 to 7.5 mm, preferably 5 mm, and the blind bore of the control piston has a diameter of 7 to 8 mm, preferably 7.5 mm. The diameter of the blind bore of the control piston is thus exactly twice as large in area as that of the through-bore. This ensures a safe operation of the valve.

The invention is characterized in particular in that it creates a flawlessly and safely opening and closing pressure limiting valve that operates with a markedly small adjustment spring, so that the entire pressure limiting valve has correspondingly small dimensions. Based on the selected and achieved dimensions of the control piston, valve piston, and the through-bore, values of 8,000 l/min and more can be achieved. Hereby the blind bore of the valve piston has a diameter of 25 mm, the through-bore of 5 mm, and the blind bore of the control piston of 7.5 mm. The large piston, i.e., the valve piston, does not open against external pressure, but rather against the compensation pressure in the compensation chamber, i.e. for instance 300 bar, making the small dimensions of the adjustment spring possible. The use of Teflon seals secures the overall structure, since high pressures occur when these seals have been driven over, and since, because of the large diameters of the valve piston used, an effective seal can only be accomplished with such seals.

Other details and advantages of the object of the invention are found in the following description of the pertaining drawing that depicts a preferred embodiment with the necessary details and parts.

DETAILED DESCRIPTION OF THE DRAWINGS

Figure 1:
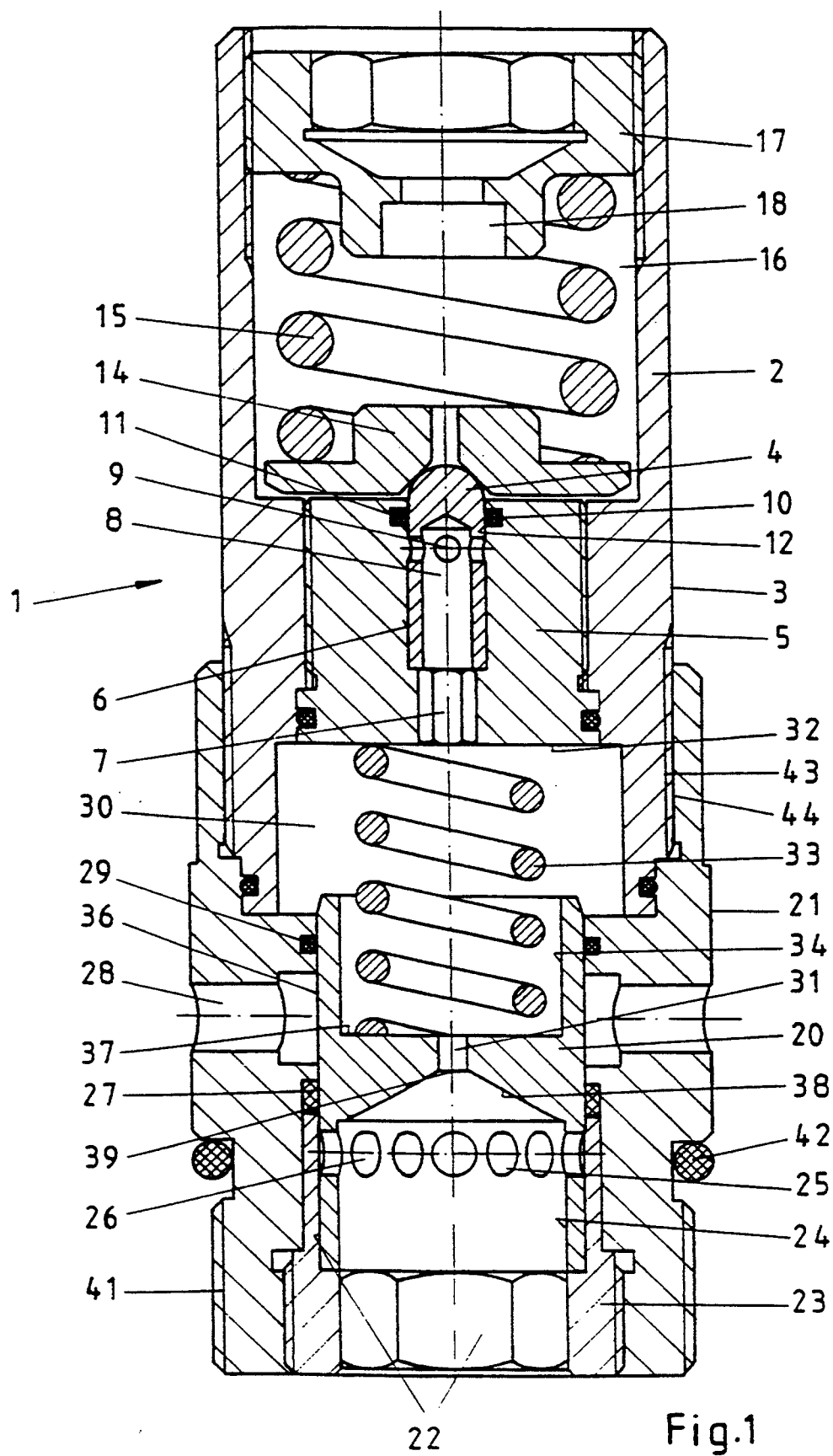
FIG. 1 shows a pressure limiting valve with control piston and valve piston in the closed position.

FIG. 1 shows such a pressure limiting valve (1) in a longitudinal section, whereby the pressure limiting valve (1) consists of a stable valve casing (2), which in the shown embodiment exhibits a top part (3) and the bottom part or casing part (21) that can be screwed to it.

The top part (3) houses the control piston (4) which is inserted into a screwed part (5), or, more accurately, into its internal bore (6). This screwed part (5) is easily attached via a hexagon socket (7) into the top part (3) from the compensation chamber that will be described in more detail below.

The control piston (4) has a blind bore (8) with a relatively large diameter (7.5 mm), and radial bores (9) originating from its deepest point. FIG. 1 shows that here only four radial bores (9) with relatively large diameters are provided.

The diameters of the radial bores (9) are larger than the diameter of the O-ring (11) sitting in the groove (10), said O-ring being seated in the groove (10) in the top end (12) of the internal bore (6). This may be an O-ring of standard rubber material that is deformed by pressure action and thus forms an optimum seal.

The head of the control piston (4) reaches into a valve plate (14) or into a recess located on the underside of the latter, whereby this valve plate supports the valve spring (15). On the opposite side of the spring chamber (16), the valve spring (15) rests against the adjustment spring (17), so that a corresponding preloading due to an adjustment of the adjustment screw (17) is possible. The pressure fluid discharged into the spring chamber (16) during the opening of the control piston (4) is released through the adjustment screw opening (18) into the atmosphere.

Similar to the control piston (4), which is arranged in the top part (3), the valve piston (20) is associated with the bottom part (21) or casing part (21). The casing part (21) exhibits a suitable large bore (22) in which the valve piston (20) is arranged in a movable manner. The valve piston (20) is inserted from the bottom via a screwed part (23), whereby the blind bore (24) with the radial bores (25, 26) is associated with the large bore or the corresponding casing opening. The blind bore (24) has a diameter of 25 mm in the shown example, so that accordingly large volumes of pressure fluid can be discharged when the valve piston (20) is opened.

The blind bore (24) has at its top end overall radial bores (25, 26) in the shown example (14). Just above these radial bores (25, 26), the sealing ring (27) is located. The latter consists of Teflon and is arranged preloaded in such a manner that it accomplishes the necessary sealing effect. FIG. 1 shows that it has for this purpose a rectangular or square cross-section, and that it can be preloaded with the attachment of the screwed part (23) in such a way that it rests tightly against the exterior wall (36) of the valve piston (20). In this way the pressure fluid is unable to flow past the exterior wall (36) into the area of the cross-bores (28).

On the opposite side of the cross-bores (28), another Teflon sealing ring (29) is arranged so that the pressure fluid that has passed through the through-bore (31) into the compensation chamber (30) also is not able to flow past the exterior wall (36) in the direction of the cross-bores (28).

The compensation chamber (30) has a diameter larger than that of the large bore (22). It forms approximately the bottom end of the top part (3), which is rotated or screwed into the bottom part (21) so as to form the compensation chamber (30). The necessary sealing is ensured with suitable sealing rings.

An adjustment screw (33) ensuring that the valve piston (20) only opens at the given time when an overload occurs rests on one side against the control piston side (32) and on the other side against the valve piston (20). The valve piston is first held by the adjustment screw (33) in the position shown in FIG. 1, so that the pressure fluid can only reach the compensation chamber (30) through the through-bore (31). Only if the corresponding pressure has been exceeded, the valve piston (20) opens and makes it possible for the pressure fluid to be discharged through the large bore (22), the high-volume blind bore (24), the radial bores (25, 26) and finally through the cross-bore (28) into the atmosphere.

To decrease the construction length of the pressure limiting valve (1), a blind hole (34) holding the adjustment spring (33) is arranged in the valve piston (20). This blind hole (34) rests level on the bottom (37), while the opposite bottom (38) in the area of the blind hole (24) is constructed conically, whereby the tip (39) merges approximately into the through-bore (31).

The top part (3) and bottom part (21) are screwed to each other. For this purpose, they have corresponding internal threads (43) and external threads (44). The entire pressure limiting valve (1) is also screwed into pressure medium consumers, i.e. for instance props, for which purpose it is equipped on the bottom part (21) with a thread (41) constructed as an external thread. The system is suitably sealed towards the outside via a sealing ring (42).

Not shown in FIG. 1 is a device through which the spring chamber (16) is kept clean. The respective parts are only suggested in the area of the adjustment screw (17) or the adjustment screw bore (18). They correspond to the state of the art.

Figure 2:
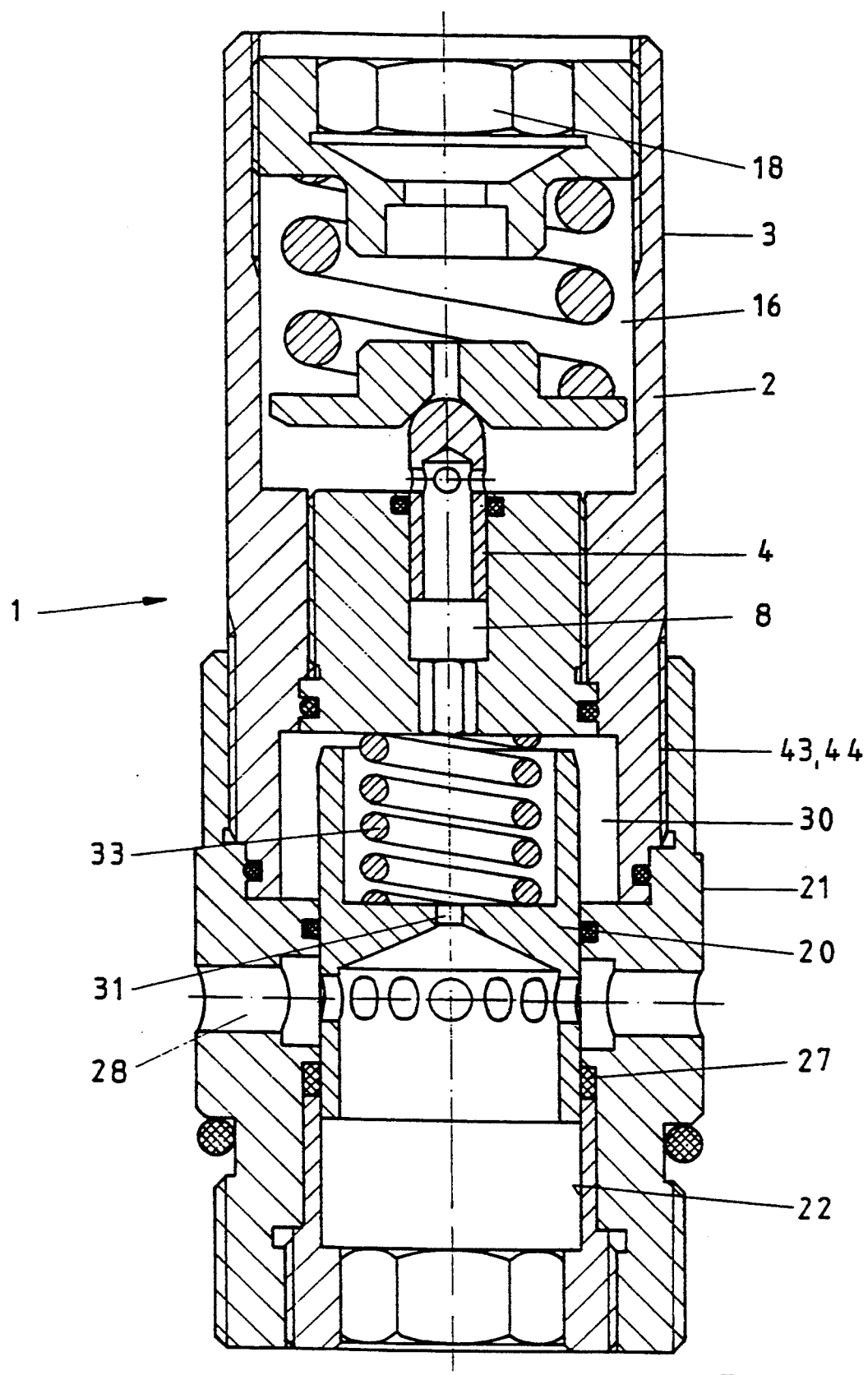
FIG. 2 shows a pressure limiting valve according to FIG. 1 which, due to an overload, is discharging.

FIG. 2 shows the pressure limiting valve (1) in the open position. The valve piston (20) has driven over the sealing ring (27), and the pressure fluid can be discharged through the cross-bores (28). At the same time, pressure fluid passes through the through-bore (31) into the compensation chamber (30), and from there through the blind bore (8) of the control piston (4) into the spring chamber (16), and from there via the adjustment spring bore (18) into the atmosphere.

If the pressure in the compensation chamber (30) is now dropping, the control piston (4) closes, and the valve piston (20) simultaneously drives into the position seen in FIG. 1, so that the valve is once again closed.

All mentioned characteristics, including those deduced solely from the drawings, are considered to be essential to the invention, either by themselves or in combination.

We claim:

1. Pressure limiting valve for protecting hydraulic units, especially protecting the hydraulic face support of underground operations against rock bursts or other overloads, comprising a control piston that is movable inside an internal bore in a valve casing against a force of a valve spring, wherein said control piston blocks off an adjustment screw bore associated with a spring chamber and cooperates with a valve piston with blind bore and radial bores, which is guided in a movable manner in an expanded large bore that merges into a compensation chamber and is sealed via sealing rings, and which, when subjected to pressure, connects the cross-bores serving as discharge bores with the large bore by driving over the sealing rings, characterized in that the control piston (4) and the valve piston (20) are separate units, that the valve piston is movable against a spring (33) supported on the control piston side (32) and has a through-bore (31) with a smaller diameter than the blind bore (8) of the control piston (4), and wherein the sealing rings (27, 29) associated with the valve piston are constructed as plastic rings and are rectangular and very hard, and that are preloaded when they are installed.

2. Pressure limiting valve as claimed in claim 1, characterized in that the compensation chamber (30) is constructed on an extension of the large bore (22) between the cross-bores (28) and an upper casing part (3) that holds the control piston (4).

3. Pressure limiting valve as claimed in claim 1, characterized in that the valve piston (20) is equipped on both sides with a blind bore (24, 34), whereby the blind bore (34) associated with the compensation chamber (30) holds the adjustment spring (33).

4. Pressure limiting valve as claimed in claim 1, characterized in that the blind bore (34) with the adjustment spring (33) has a bottom (37) that extends at a right angle to an exterior wall (36) of the valve piston (20).

5. Pressure limiting valve as claimed in claim 1, characterized in that the blind bore (24) with the radial bores (25, 26) exhibits a conically constructed bottom (38) in whose tip (39) is arranged the through-bore (31).

6. Pressure limiting valve as claimed in claim 1, characterized in that the control piston (4) is housed in a screwed part (3) with an internal bore (6) that can be screwed into the valve casing (2) from the compensation chamber (30).

7. Pressure limiting valve as claimed in claim 6, characterized in that the internal bore (6) has a hexagon socket (7) on the side facing the compensation chamber (30).

8. Pressure limiting valve as claimed in claim 6, characterized in that the internal bore (6) is constructed so as to hold the control piston (4) one one side of a hexagon socket (7), and has at the top end (41) a groove (10) for a sealing ring constructed as an O-ring (11).

9. Pressure limiting valve as claimed in claim 8, characterized in that the control piston (4) is equipped with four radial bores (9) whose diameter is greater than a cord thickness of the O-ring (11).

10. Pressure limiting valve as claimed in claim 1, characterized in that the through-bore (31) has a diameter of 2.5 to 7.5 mm, and the blind bore (8) of the control piston (4) has a diameter of 7 to 8 mm.

11. Pressure limiting valve as claimed in claim 1, characterized in that the through-bore (31) has a diameter of 5 mm.

12. Pressure limiting valve as claimed in claim 1, characterized in that the blind bore (8) of the control piston (4) has a diameter of 7.5 mm.

* * * * *